(12) United States Patent
Takasuka (10) Patent No.: US 7,806,532 B2
(45) Date of Patent: Oct. 5, 2010

(54) PROJECTOR FOR PROJECTING AN OPTICAL IMAGE FORMED BY LIGHT MODULATED BY A LIGHT MODULATING DEVICE

(75) Inventor: Hideki Takasuka, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 759 days.

(21) Appl. No.: 11/702,405

(22) Filed: Feb. 5, 2007

(65) Prior Publication Data

US 2007/0195282 A1    Aug. 23, 2007

(30) Foreign Application Priority Data

Feb. 23, 2006  (JP)  ............................. 2006-047245
Apr. 26, 2006  (JP)  ............................. 2006-121723

(51) Int. Cl.
G03B 21/16  (2006.01)
G03B 21/26  (2006.01)
G02B 7/02   (2006.01)

(52) U.S. Cl. ............................. 353/60; 353/61; 353/56; 353/58; 359/820

(58) Field of Classification Search .................. 353/57, 353/60, 52, 61, 56, 58; 359/820
See application file for complete search history.

(56) References Cited

U.S. PATENT DOCUMENTS

| 6,007,205 A * | 12/1999 | Fujimori ...................... 353/57 |
| 6,334,686 B1 * | 1/2002 | Shiraishi et al. ............... 353/57 |
| 6,364,492 B1 | 4/2002 | Fujimori et al. |
| 6,431,710 B2 * | 8/2002 | Fuse et al. ..................... 353/57 |
| 6,637,895 B2 | 10/2003 | Fujimori et al. |
| 6,751,027 B2 * | 6/2004 | Van Den Bossche et al. ..... 359/634 |
| 6,783,245 B2 * | 8/2004 | Konuma et al. ................ 353/61 |
| 6,796,660 B2 * | 9/2004 | Shiraishi et al. ................ 353/57 |
| 6,832,837 B2 * | 12/2004 | Suzuki et al. .................. 353/61 |
| 6,840,628 B2 * | 1/2005 | Arai et al. ...................... 353/58 |

FOREIGN PATENT DOCUMENTS

| JP | 03-066099 U | 6/1991 |
| JP | 09-189966 A | 7/1997 |
| JP | 10-186513 A | 7/1998 |
| JP | 2001-209126 A | 8/2001 |
| JP | 2001-228803 A | 8/2001 |
| JP | 2002-174855 A | 6/2002 |
| JP | 2003-241316 A | 8/2003 |
| JP | 2005-017458 A | 1/2005 |

* cited by examiner

Primary Examiner—Georgia Y Epps
Assistant Examiner—Magda Cruz
(74) Attorney, Agent, or Firm—AdvantEdge Law Group, LLC (57) ABSTRACT

A projector includes a light source; a light modulating device that modulates the flux of light emitted from the light source on the basis of image information to form an optical image; a projection optical system that projects the formed optical image; and an exterior housing that accommodates the light source, the light modulating device, and the projection optical system. An opening that introduces air from the outside of the exterior housing into the inside thereof is formed in the exterior housing. An object to be cooled, a duct connecting the opening to the objects to be cooled, and a filter purifying the air introduced from the opening are provided inside the exterior housing. A cooling fan that sucks the air having been purified through the filter and sends the air to the object to be cooled are provided in the duct.

4 Claims, 9 Drawing Sheets

PROJECTOR FOR PROJECTING AN OPTICAL IMAGE FORMED BY LIGHT MODULATED BY A LIGHT MODULATING DEVICE

BACKGROUND

1. Technical Field

The present invention relates to a projector that includes a light source, an optical modulation device modulating the flux of light emitted from the light source on the basis of image information so as to form an optical image, a projection optical system projecting the formed optical image, and a housing for accommodating the optical modulation device and the projection optical system therein.

2. Related Art

There has been known Projectors each modulate the flux of light emitted from a light source on the basis of image information to form optical images, and magnify and project the optical images onto, for example, a screen.

When driving such a projector, electronic components and optical components constituting the corresponding projector emit heat. Among these electronic components and optical components, some components are easily affected by heat. When the temperature of a heat-sensitive component exceeds the maximum allowable temperature, image formation may not be properly performed. In order to prevent rise in the temperature of a heat-sensitive component, a method of sending air introduced from the outside of the projector to cool the heat-sensitive component can be used.

However, the externally introduced air may contain dust particles. When dust particles enter into the projector, the shades of the dust particles are projected together with optical images so as to deteriorate the images or the dust particles reduce cooling efficiency. In order to prevent infiltration of dust particles, a projector having an sealed space formed therein has been known (see, for example, JP-A-2001-209126).

According to the projector disclosed in JP-A-2001-209126, a sealed space is formed in a housing, and liquid crystal light valves to be cooled and a fan for circulating air in the sealed space are provided in the sealed space. In this projector, air in the sealed space is circulated by rotating the circulating fan, thereby cooling the liquid crystal light valves and dissipating the heat of the heated air from the sealed space.

However, in the projector disclosed in JP-A-2001-209126, since it is needed to form side walls for forming the sealed space in which the liquid crystal light valves to be cooled and the circulating fan are disposed, the inner structure of the housing becomes complicated, which makes the process of manufacturing the projector cumbersome and complicated. For this reason, it is required a technique capable of reliably cooling an object to be cooled in a projector by properly blowing pure air containing no dust.

SUMMARY

An advantage of some aspects of the invention is that it provides a projector capable of more efficiently cooling an object to be cooled by blowing pure air.

According to an aspect of the invention, a projector includes: a light source; a light modulating device that modulates the flux of light emitted from the light source on the basis of image information to form an optical image; a projection optical system that projects the formed optical image; and an exterior housing that accommodates the light source, the light modulating devices, and the projection optical system. An opening that introduces air from the outside of the exterior housing into the inside thereof is formed in the exterior housing. An object to be cooled, a duct connecting the opening to the object to be cooled, and a filter purifying the air introduced from the opening are provided inside the exterior housing. A cooling fan that sucks the air having been purified through the filter and sends the air to the object to be cooled are provided in the duct. A first sealing member that fills a gap is interposed between the cooling fan and the duct.

Examples of the object to be cooled can include optical components used for image formation, a control device controlling the projector main unit, and a power supply device supplying power to individual electronic components constituting the projector, in addition to the light modulating devices and the light source.

According to the aspect of the invention, since the first sealing member is interposed between the duct and each cooling fan, it is possible to prevent a gap from being made between the duct and each cooling fan. Therefore, air introduced from the opening formed in the exterior housing and circulating in the duct is sucked by the cooling fan and sent to the objects to be cooled. Accordingly, since it is possible to prevent air entering between the duct and the cooling fan from being mixed with air sent from the cooling fan, air purified through the filter can be sent to the objects to be cooled. Therefore, since air containing dust is not sent to the objects to be cooled, it is possible to purely keep the objects to be cooled and to reliably cool the objects to be cooled. Further, according to the aspect of the invention, since it is unnecessary to form a sealed space inside the exterior housing, it is possible to simplify the structure of the projector, as compared to the projector disclosed in JP-A-2001-209126.

According to the aspect of the invention, it is preferable that the cooling fan include a fan main body which has a blade member supported by a rotating shaft of a rotary drive source and a housing containing the rotary drive source and discharges air, sucked from an air inlet formed in the housing, through an air outlet, and a fan cover which covers the fan main body and has openings formed at positions corresponding to the air inlet and the air outlet. Further, it is preferable that a rib that presses the first sealing member is formed on the fan cover.

According to the above-mentioned structure, the rib is formed in the fan cover provided to the cooling fan so as to press the first sealing member interposed between the cooling fan and the duct. Therefore, when the cooling fan is closely adhered to the duct with the first sealing member interposed therebetween, it is possible to prevent the rotation of the rotary drive source provided to the fan main body from being restricted by the first sealing member.

If the fan main body directly presses the first sealing member, since the first sealing member is interposed between the fan main body and the duct, the first sealing member may press the housing of the fan main body to strain the housing. In this case, the blade members provided on the rotating shaft of the rotary drive source may hit against the strained housing such that the rotation of the rotating shaft is restricted and thus air suction and exhaust by the fan main body are not properly performed.

In contrast, according to the above-mentioned structure, since the rib is formed on the fan cover to press the first sealing member, it is possible to properly perform air suction and exhaust by means of the fan main body without directly pressing of the first sealing member by the fan main body. Therefore, it is possible to prevent the cooling efficiency of the cooling fan to the objects to be cooled from being reduced.

Further, according to the aspect of the invention, it is preferable that the first sealing member is formed of a cushion member.

When the first sealing member is formed of, for example, rubber, in the region where both surfaces of the first sealing member are in contact with a surface of the cooling fan and a surface of the duct, the first sealing member is closely adhered to the cooling fan and the duct. However, in a region where the first sealing member is not in contact with the cooling fan and the duct by the surfaces, since the first sealing member is less deformed according to the shapes of the cooling fan and the duct as compared to the cushion member, a gap can be made. In contrast, since the cushion member is more easily deformed, when the first sealing member according to the aspect of the invention is formed of the cushion member, the first sealing member is deformed according to the shape of the cooling fan or the duct, which makes it possible to reliably prevent a gap from being made between the cooling fan and the duct. Therefore, it is possible to reliably prevent a gap from being made between the cooling fan and the duct owing to the first sealing member and to reliably prevent air containing dust from being sucked and exhausted by the cooling fan.

Furthermore, according to the aspect of the invention, it is preferable that a second sealing member that fills a gap be interposed between a side wall of the exterior housing where the opening is formed and the filter.

According to this structure, between the filter that purifies the air introduced into the exterior housing through the opening formed in the exterior housing and the side wall of the exterior housing where the opening is formed, the second sealing member is interposed to fill the gap between the filter and the side wall.

Therefore, since it is possible to prevent air from entering between the side wall where the opening is formed and the filter owing to the second sealing member, it is possible to reliably prevent dust from externally entering into the exterior housing. Accordingly, it is possible to surely pass the air to be introduced into the exterior housing through the filter and thus to prevent dust from entering into the projector. Further, it is possible to prevent dust from being attached to the optical components or electronic components constituting the projector.

In addition, according to the aspect of the invention, it is preferable that, in the duct, a rectifying portion that is provided at the rear side of an air circulation path with respect to the filter and extend so as to cross an air circulation direction.

In this structure, the rectifying portions are provided in the duct to face the filter. Therefore, the air having passed through the filter once collides against the rectifying portions and then circulates in the dust. Accordingly, it is possible to attach dust, which couldn't have been trapped by the filter, to the rectifying portions. That is, it is possible to make the rectifying portions function as a second filter to trap minute dust having passed through the filter by means of the rectifying portions. Also, even when the filter is partially broken and dust passes through the broken parts of the filter, it is possible to trap the dust by means of the rectifying portions. Therefore, it is possible to more reliably and purely keep the objects to be cooled by providing the rectifying portions.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described with reference to the accompanying drawings.

External Appearance of Projector

Figure 1:
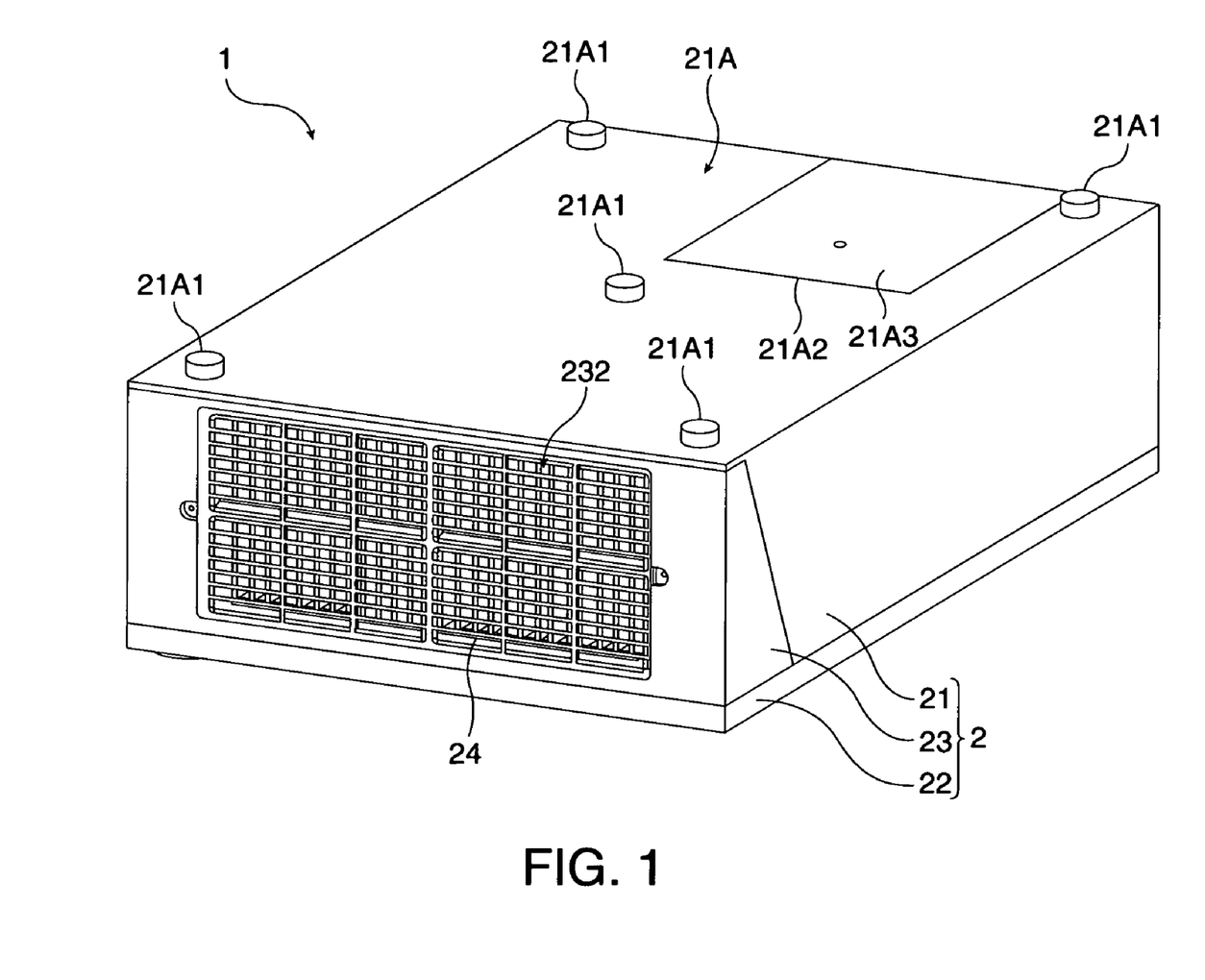
FIG. 1 is a perspective view illustrating the appearance of a projector according to an embodiment of this invention.

FIG. 1 is a perspective view illustrating an external appearance of a projector 1 according to an embodiment of this invention.

The projector 1 according to this embodiment modulates the flux of light emitted from a light source provided inside on the basis of image information so as to form an optical image, and magnifies and projects the optical image onto, for example, a screen.

As shown in FIG. 1, the projector 1 is provided with a substantially cubical exterior housing 2. This exterior housing 2 includes an upper case 21 forming the top and side surfaces of the projector 1, a lower case 22 forming the bottom surface of the projector 1, and a side case 23 forming a side surface of the projector 1 along an optical image projection direction, which are fixed to one another by means of, for example, screws.

The material of the exterior housing 2 is not limited to only synthetic resin but may be another material, such as metal.

A plurality of protruding legs (not shown) are formed on the bottom surface of the lower case 22 so as to be in contact with the installation surface when the projector 1 is normally installed (is mounted on an installation surface of, for example, a table). Also, a plurality of (five in this embodiment) protruding legs 21A1 are formed on the top surface 21A of the upper case 21 so as to be in contact with the ceiling when the projector 1 is suspended from the ceiling. In the top surface 21A, an opening 21A2 used to exchange a light source lamp 416 constituting an optical unit 4 to be described below is formed. The opening 21A2 is closed by a lid 21A3.

Figure 4:
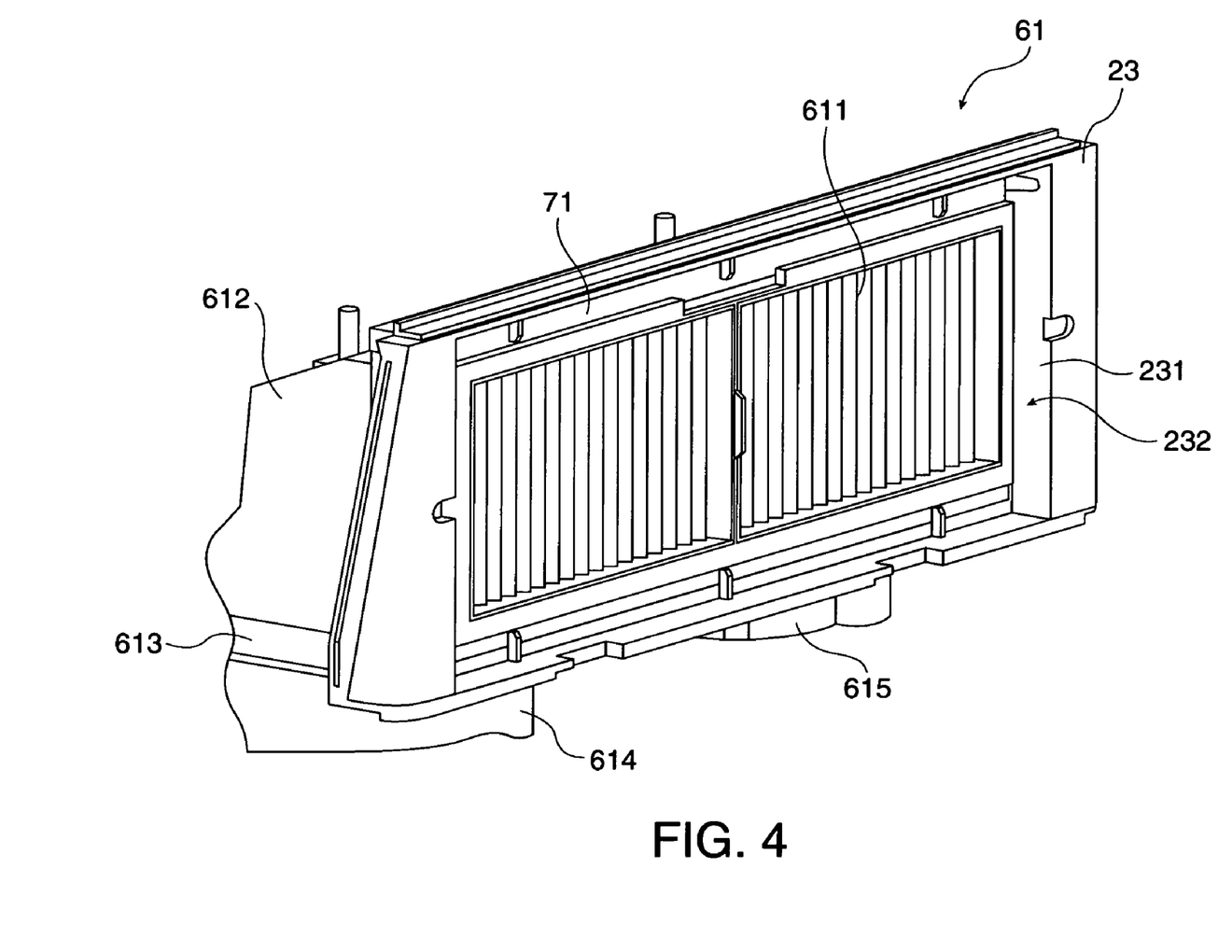
FIG. 4 is an enlarged perspective view illustrating a portion of a first cooling system according to the embodiment of this invention.

The side case 23 constitutes one of the side surfaces along the optical image projection direction of the exterior housing 2, which is closest to a projection lens 3 to be described below. Although not shown in FIG. 1 in detail, at the substantially center of the side case 23, a concave portion 231 (see FIG. 4)

having a substantially rectangular shape and sunk inward is formed. At the substantially center of the concave portion 231, an opening 232 having substantially an elongated rectangular shape in a horizontal direction is formed. Through this opening 232, a first cooling system 61 of a cooling unit 6, which will be described below, externally introduces cooling air into the exterior housing 2. Also, in the concave portion 231, a slit 24 is provided to cover the opening 232. The cooling unit 6 will be described below in detail.

Internal Structure of Projector 1

Figure 2:
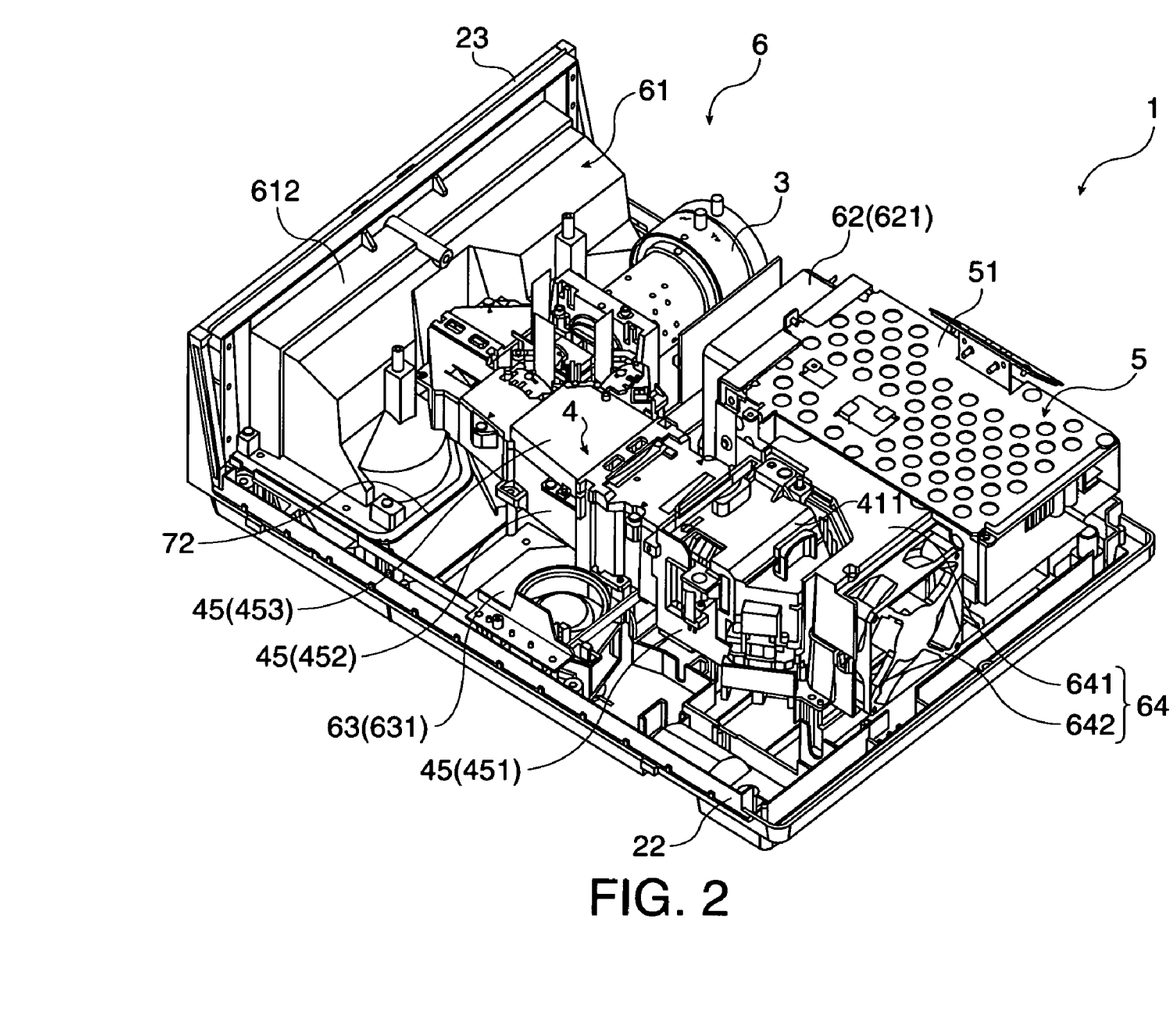
FIG. 2 is a perspective view illustrating the internal structure of the projector according to the embodiment of this invention.

FIG. 2 is a perspective view illustrating the internal structure of the projector 1. More specifically, FIG. 2 is a perspective view illustrating the projector 1 that the upper case 21 is removed.

As shown in FIG. 2, the projection lens 3, the optical unit 4 that forms optical images, a power supply unit 5 that supplies power to individual components constituting the projector 1, a control unit (not shown) that controls the whole projector 1, and the cooling unit 6 that cools optical components and electrical components dissipating heat are arranged inside the exterior housing 2.

The projection lens 3 functions as a projection optical system, which magnifies and projects an optical image (color image) formed by the optical unit 4 onto a screen (not shown). The projection lens 3 is a group lens in which a plurality of lenses is contained in a cylindrical lens barrel, and a projection port is exposed through an opening (not shown) formed in the upper case 21.

Structure of Optical Unit 4

Figure 3:
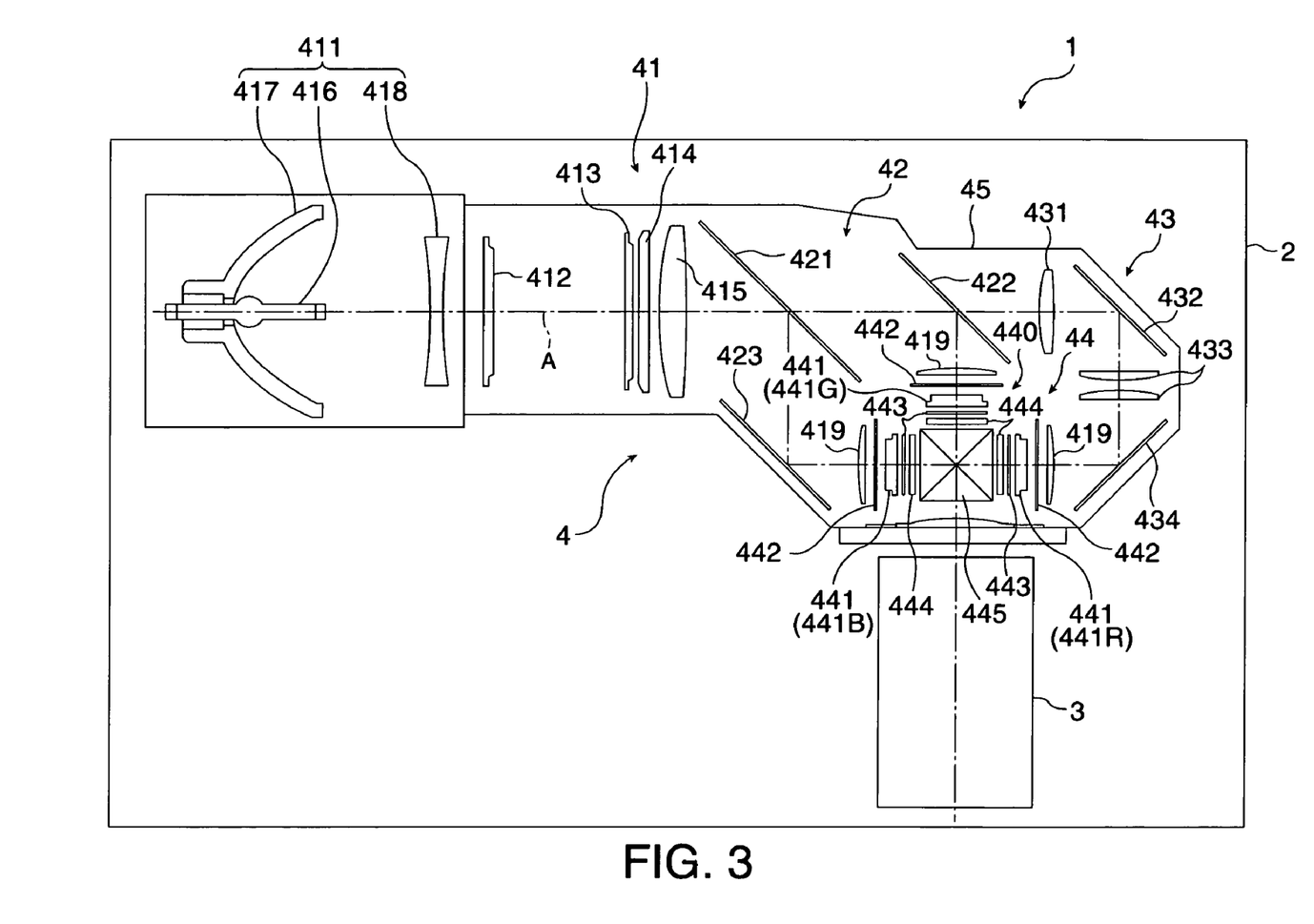
FIG. 3 is a view schematically illustrating the optical unit according to the embodiment of this invention.

FIG. 3 is a view schematically illustrating the optical system of the optical unit 4.

The optical unit 4 optically processes the flux of light emitted from the light source under control of the control unit to form an optical image (color image) corresponding to image information. As shown in FIG. 2, the optical unit 4 extends along both the back surface of the exterior housing 2 and a side surface (surface on which the opening 232 is formed) of the exterior housing 2 to have an L shape in plan view.

As shown in FIG. 3, the optical unit 4 includes an illuminating optical device 41, a color-separating optical device 42, a relay optical device 43, an electro-optical device 44, and an optical component housing 45 inside which those optical components 41 to 44 are disposed.

The illuminating optical device 41 is an optical system for almost uniformly illuminating an image forming region of a liquid crystal panel 441 constituting the electro-optical device 44, which will be described below. The illuminating optical device 41 includes a light source device 411, a first lens array 412, a second lens array 413, a polarization converting element 414, and a superimposing lens 415.

The light source device 411 includes a light source lamp 416 that emits a radial light beam, a reflector 417 that reflects radial light emitted from the light source lamp 416 to focus the light at a predetermined position, and a parallelizing concave lens 418 that parallelizes the flux of light focused by the reflector 417 with respect to an illumination optical axis A. A halogen lamp, a metal halide lamp, or a high pressure mercury lamp can be used as the light source lamp 416. An ellipsoidal reflector can be used as the reflector 417. Alternatively, a parabolic reflector can be used as the reflector 417. In this case, the parallelizing lens 418 can be omitted.

The first lens 412 has a structure in which small lenses each having substantially a rectangular profile as viewed from an optical axis are disposed in a matrix. The individual small lenses split the flux of light emitted from the light source device 411 into a plurality of partial light fluxes.

The second lens 413 has the same structure as the first lens 412. That is, the second lens 413 has a structure in which small lenses are disposed in a matrix. The second lens 413 has a function of forming an image emitted from the individual small lenses of the first lens 412 in the image forming region of the liquid crystal panel 441 (to be described below) of the electro-optical device 44 in cooperation with the superimposing lens 415 disposed at the rear side of a light path of the second lens array 413.

The polarization converting element 414 is disposed between the second lens array 413 and the superimposing lens 415 and converts the light from the second lens array 413 into substantially one kind of linearly polarized light.

More specifically, the partial light fluxes are converted into substantially one kind of linearly polarized light by the polarization converting element 414, and the linearly polarized light is finally superimposed in the image forming region of the liquid crystal panel 441 to be described below. In a projector using a liquid crystal panel of a type of modulating polarized light, since only one kind of polarized light can be used, almost half of light from the light source device 411 emitting random polarized light cannot be used. For this reason, the polarization converting element 414 is used to convert the light emitted from the light source device 411 into substantially one kind of linearly polarized light, thereby improving the light use efficiency of the electro-optical device 44.

The color-separating optical device 42 includes two dichroic mirrors 421 and 422 and a reflective mirror 423, and has a function of separating the plurality of partial luminous fluxes emitted from the illuminating optical device 41 into red, green, and blue light components by the dichroic mirrors 421 and 422.

The relay optical device 43 includes an incident side lens 431, a relay lens 433, and reflective mirrors 432 and 434, and has a function of guiding the red light component separated by the color-separating optical device 42 to the liquid crystal panel 441 (441R) for a red color component.

At this time, in the dichroic mirror 421 of the color-separating optical device 42, the red and green light components of the flux of light emitted from the illuminating optical device 41 are transmitted and the blue light component is reflected. The blue light component reflected by the dichroic mirror 421 is reflected by the reflective mirror 423 and passes through a field lens 491 so as to reach the liquid crystal panel 441 (441B) for a blue light components. The field lens 419 converts the partial light fluxes emitted from the second lens array 413 into light fluxes parallel to a central axis of the field lens (a main light beam). A field lens 419 disposed on the light incoming side of the liquid crystal panel 441 (441G or 441R) for a green or red light component has the same function as the field lens 419 disposed on the light incoming side of the liquid crystal panel 441 (441B) for a blue light component.

The green light component having passed through the dichroic mirror 421 is reflected by the dichroic mirror 422 and passes through the field lens 419 so as to reach the liquid crystal panel 441 (441G) for a green light component. Meanwhile, the red light component having passed through the dichroic mirror 421 passes through the dichroic mirror 422, the relay optical device 43, and the field lens 419 so as to reach the liquid crystal panel 441 (441R) for a red light component. Since the length of the path of the red light component is longer than the lengths of the paths of the other light components, the light usage efficiency may be reduced due to, for example, diffusion of light. The reason why the relay optical device 43 is disposed on the path of the red light component is to prevent the light usage efficiency from being reduced, that is, to transmit the partial light fluxes incident on the incident side lens 431 to the field lens 419 without loss. The relay optical device 43 is configured to transmit the red light component among the three color light components. However, the invention is not limited thereto. The relay optical device 43 may be configured to transmit, for example, the blue light component.

The electro-optical device 44 modulates the three color light components emitted from the color-separating optical device 42 on the basis of the image information and synthesizes the modulated color light components so as to form an optical image (color image). The electro-optical device 44 includes the three liquid crystal panels 441 (the liquid crystal panel 441R for a red light component, the liquid crystal panel 441G for a green light component, and the liquid crystal panel 441B for a blue light component) serving as optical modulating devices, three incident side polarizing plates 442 disposed on the incident sides of the liquid crystal panels 441, three viewing angle compensating films 443 disposed on the outgoing side of the liquid crystal panels 441, three outgoing side polarizing plates 444 disposed on the outgoing side of the three viewing angle compensating films 443, and a cross dichroic prism 445 serving as a color synthesizing optical device. Among these components, the liquid crystal panels 441, the viewing angle compensating films 443, the outgoing side polarizing plates 444, and the cross dichroic prism 445 are combined by a fixing member (not shown) to constitute an electro-optical device main body 440 (see FIGS. 3 and 8).

When the color light components whose polarized directions are substantially aligned in one direction by the polarization converting element 414 are incident, the incident side polarizing plate 442 transmits only polarized light components, having substantially the same direction as the light flux polarizing axis aligned by the polarization converting element 414, of the incident partial light fluxes, and absorbs the other partial light fluxes. The incident side polarizing plate 442 has, for example, a structure in which a polarizing film is bonded onto a transmissive substrate formed of sapphire glass or quartz.

Each liquid crystal panel 441 has a structure in which liquid crystal, which is an electro-optical substance, is closely injected into a pair of transparent glass substrates. The alignment state of the liquid crystal in the image forming region is controlled in accordance with a driving signal input from a control unit to be described below such that the polarizing direction of the polarized light flux emitted from the incident side polarizing plate 442 is modulated so as to form a color image corresponding to the incident color light components.

The viewing angle compensating film 443 is formed in a film-like shape and compensates a phase difference occurring between normal light and abnormal light due to birefringence occurring in the liquid crystal panel 441 when the flux of light is obliquely incident on the liquid crystal panel 441 (obliquely incident to the normal direction of the incident surface of the liquid crystal panel 441). The viewing angle compensating film 443 is formed of an optical anisotropic substance having a negative uniaxial property and is aligned such that the optical axis of the viewing angle compensating film 443 heads in a predetermined direction in the film surface and is outwardly inclined with respect to the film surface at a predetermined angle.

The viewing angle compensating film 443 can have, for example, a structure in which a discotic (disk) compound layer is formed on a transparent supporting member formed of, for example, TAC (triacetylcellulose) with an alignment film interposed therebetween. Alternatively, a WV film (made by Fuji Photo Film Co., Ltd.) can be used as the viewing angle compensating film 443.

The outgoing side polarizing plates 444 transmits only partial light fluxes, having the polarizing axes perpendicular to the light flux transmittance axis of the incident side polarizing plate 442 of the partial light fluxes having emitted from the liquid crystal panel 441 and passed through the viewing angle compensating film 443, and absorbs the other partial light fluxes.

The cross dichroic prism 445 is an optical element that synthesizes the individual color light components as color images emitted from the outgoing side polarizing plates 444 to form an optical image (color image). The cross dichroic prism 445 is formed by adhering four rectangular prisms and is substantially square in plan view. On the interfaces between the adjacent rectangular prisms, two dielectric multi-layer films are formed. The dielectric multi-layer films transmits the color light component having passed through the outgoing side polarizing plate 444 disposed on the side opposite to the projection lens 3 (the green light component side) and reflects the other two color light components having passed through the outgoing side polarizing plates 444 (the red and blue light component sides). In this way, the modulated individual color light components are synthesized by the incident side polarizing plates 442, the liquid crystal panels 441, the viewing angle compensating films 443, and the outgoing side polarizing plates 444 so as to form a color image.

The optical component housing 45 is a box-shaped member formed of synthetic resin, in which a predetermined illumination optical axis A is set, the above-mentioned optical components 41 to 44 are disposed at predetermined positions with respect to the illumination optical axis A, and the projection lens 3 is supported and fixed at a predetermined position.

As shown in FIG. 2, the optical component housing 45 includes a light source containing member 451 containing the light source device 411, a component containing member 452 containing the optical components 41 to 44 except for the light source device 411, and a lid-shaped member 453 closing an optical component entrance opening of the component containing member 452.

The light component containing member 451 is a box-shaped member having a U shape in longitudinal sectional view member and opened upper surface, and an exchange the light source device 411 through the opening 21A2 formed in the upper surface 21A of the upper case 21.

The component containing member 452 is a box-shaped member having a U shape in longitudinal sectional view and has the component entrance opening formed upside. The component containing member 452 is connected to the light source containing member 451. Although not shown in detail, in the side wall of the component containing member 452 connected to the light source containing member 451, an opening through which the flux of light emitted from the light source device 411 contained in the light source containing member 451 passes is formed. Further, although not shown, inside the component containing member 452, a plurality of grooves for positioning and fixing the optical components 41 to 44 except for the light source device 411 are formed.

Structure of Power Supply Unit 5

Referring to FIG. 2, the power supply unit 5 supplies power to the individual optical components constituting the projector 1. The power supply unit 5 is disposed along the longitudinal direction of the projector 1 to be substantially parallel to the optical unit 4. Further, the power supply unit 5 is covered by an electromagnetically shielding member 51 in order to prevent EMI (electromagnetic interference). Although not shown in detail, the power supply unit 5 includes a power supply block and a light source driving block.

The power supply block converts commercial AC input through a power supply cable (not shown) into DC, increases or decreases voltages according to individual electronic components, such as the light source driving block and the control unit, and then supplies the increased or decreased voltages to the individual electronic components.

The light source driving block rectifies the DC supplied from the power supply block and performs voltage transformation so as to generate a rectangular wave AC, and then supplies the rectangular wave AC to the light source lamp 416 of the light source device 411 so as to turn on the light source lamp 416. The light source driving block is electrically connected to the control unit. The control unit controls the light source lamp 416 to be turned on through the light source driving block.

Structure of Control Unit

Even though not shown in detail, the control unit is formed of a circuit board having a CPU (central processing unit), a ROM (read only memory), and a RAM (random access memory), etc. mounted thereon, and controls the driving of the whole projector 1. For example, the control unit processes image information input from a connection terminal exposed from the exterior housing 2 so as to control the driving of the liquid crystal panels 441 of the optical unit 4 and the turning on of the light source lamp 416 of the light source device 411. Further, the control unit controls the driving of individual cooling fans constituting the cooling unit 6 so as to efficiently cool objects to be cooled.

Structure of Cooling Unit 6

The cooling unit 6 introduces cooling air from the outside of the projector 1 and cools the objects to be cooled, which are heat dissipating components, such as electronic components or optical components, constituting the projector 1. The cooling unit 6 includes a first cooling system 61 cooling the liquid crystal panels 441 and so on, a second cooling system 62 cooling the power supply unit 5, a third cooling system 63 cooling the light source lamp 416, and an exhausting system 64 exhausting the cooling air for cooling in the first to third cooling systems 61 to 63 to the outside of the projector 1.

The second cooling system 62 has an axial flow fan 621 disposed at a position along the projection direction of the projection lens 3, and sends the cooling air, which is introduced from the outside of the projector 1 into the exterior housing 2 by the first cooling system 61, to the power supply unit 5 so as to cooling the power supply unit 5.

The third cooling system 63 has a Sirocco fan 631 sending the air in the exterior housing 2 to the light source device 411 through a duct (not shown). The cooling air discharged to the light source device 411 is circulated in the light source containing member 451 of the optical component housing 45 so as to cool the light source lamp 416 of the light source device 411 contained in the light source containing member 451.

The exhausting system 64 exhausts the cooling air having cooled the heat dissipating components in the projector 1 to the outside. More specifically, the exhausting system 64 includes a duct 641 interposed between the power supply unit 5 and the light source containing member 451, and an axial flow fan 642. The axial flow fan 642 sucks the cooling air having cooled the power supply unit 5 and the cooling air having cooled the light source lamp 416 through the duct 641. Then, the axial flow fan 642 exhausts the sucked cooling air to the outside of the projector 1 through an exhaust port (not shown) formed in the side surface, opposite to the surface of the exterior housing 2 on which the opening 232 is formed.

FIG. 4 is a perspective view illustrating a portion of the first cooling system 61.

As described above, the first cooling system 61 introduces the cooling air from the outside of the projector 1 through the opening 232 formed in the side case 23 and cools the liquid crystal panels 441, the polarization converting element 414, etc.

Figure 7:
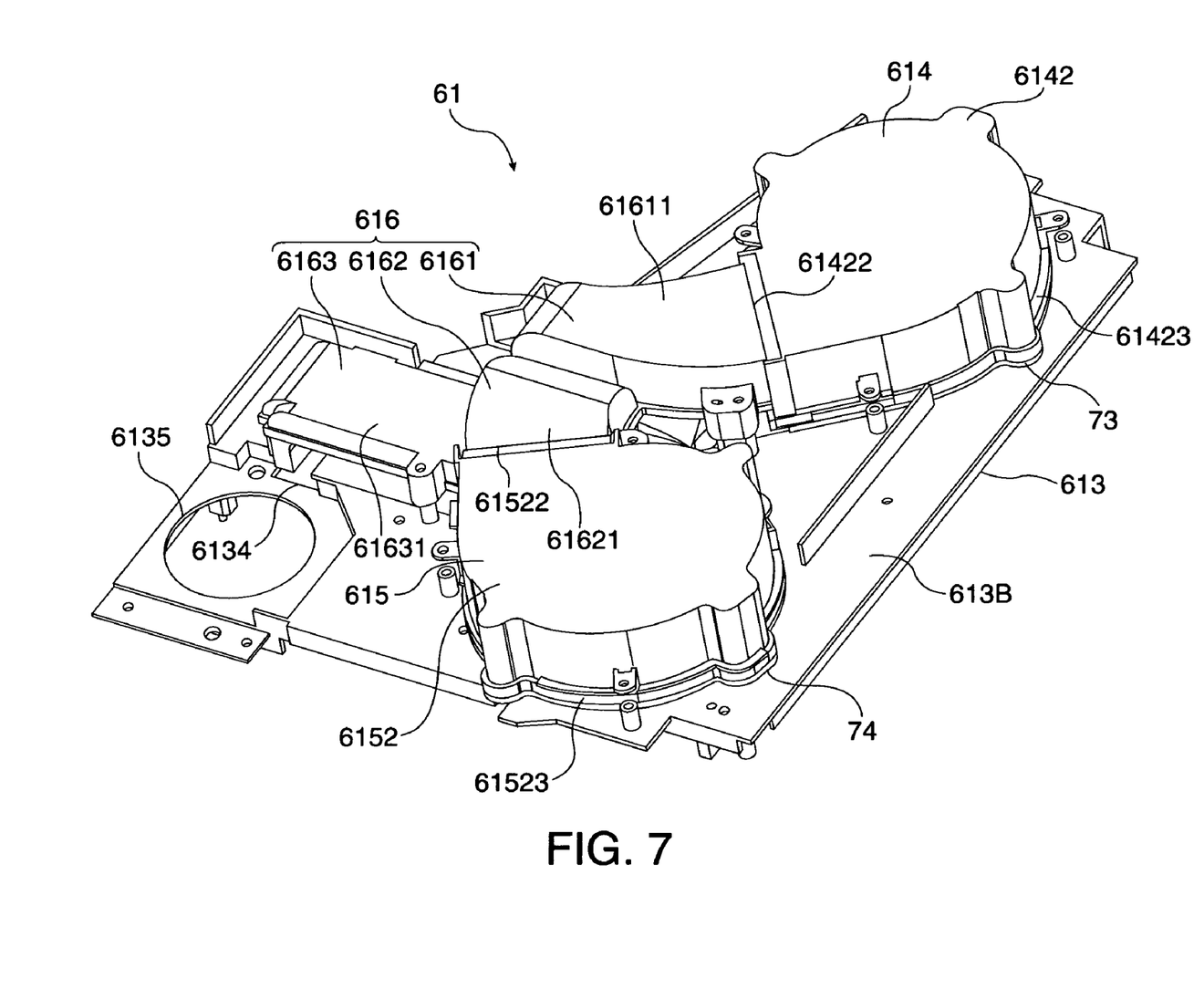
FIG. 7 is a perspective view illustrating the state in which the cooling fans and the second duct are assembled to the base duct according to the embodiment of this invention as viewed from the downside.

As shown in FIGS. 2 and 4, the first cooling system 61 includes a filter 611, a first duct 612, a base duct 613, two cooling fans 614 and 615, and a second duct 616 (FIG. 7). The two cooling fans 614 and 615 correspond to cooling fans according to an embodiment of the invention and the first duct 612, the base duct 613, and the second duct 616 constitutes a duct according to an embodiment of the invention.

As shown in FIG. 4, the filter 611 is provided inside the exterior housing 2 so as to correspond to the opening 232. The filter 611 is for purifying the air introduced from the opening 232 and is fixed to the concave portion 231 of the side case 23 and the first duct 612.

Between the filter 611 and the inner surface of the side case 23 where the opening 232 is formed, a first cushion 71 is interposed as a second sealing member according to an embodiment of the invention.

More specifically, the first cushion 71 is formed of synthetic resin having elasticity and is closely adhered to the filter 611 and the side case 23 in order to fill the gap between the filter 611 and the side case 23. Therefore, when the cooling fans 614 and 615 to be described below are driven to introduce the cooling air into the exterior housing 2 through the opening 232, substantially the whole of the cooling air is introduced into the exterior housing 2 through the filter 611 such that the air purified by the filter 611 is introduced into the exterior housing 2.

Figure 5:
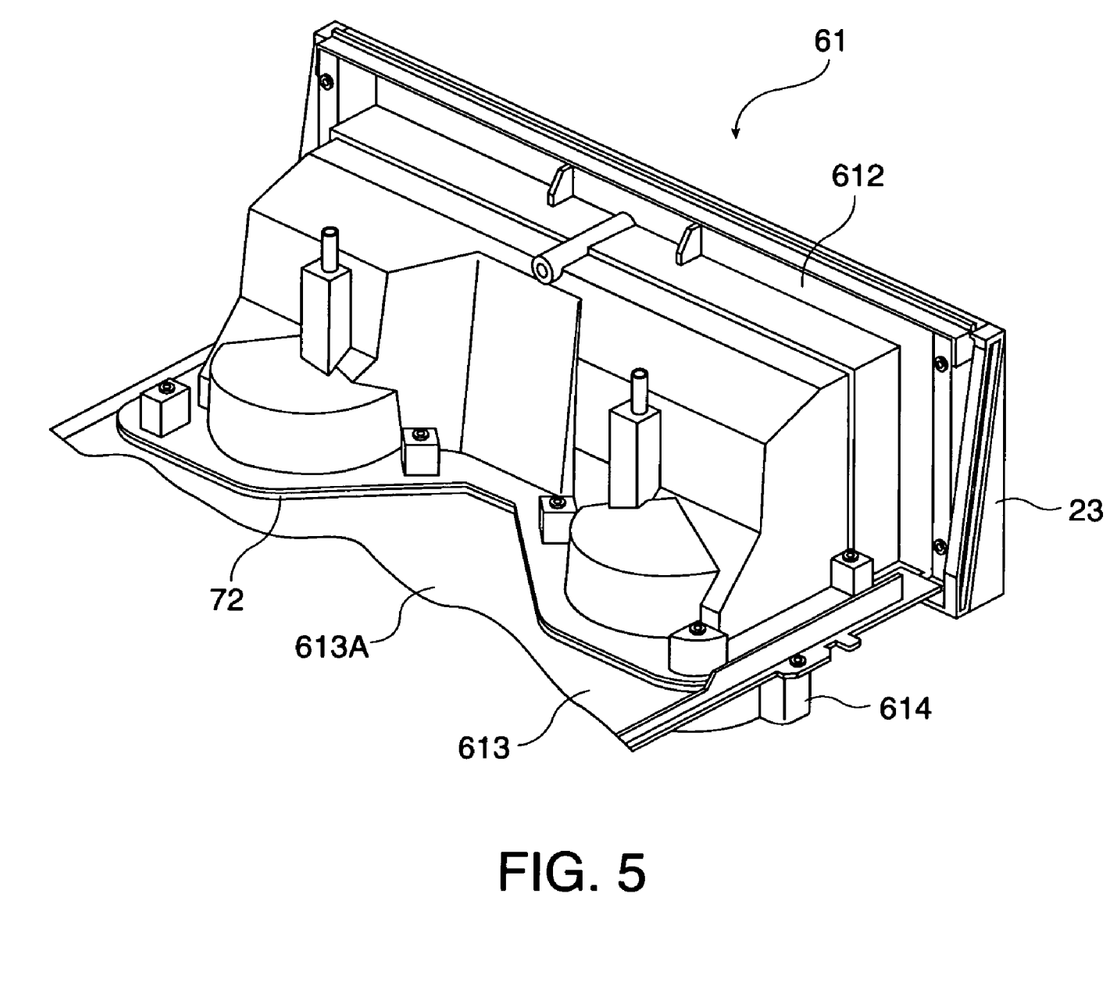
FIG. 5 is an enlarged perspective view illustrating a portion of a first cooling system according to the embodiment of this invention.

FIG. 5 is a view illustrating a portion of the first cooling system 61. More specifically, FIG. 5 is a view illustrating the first cooling system 61 as viewed from the opposite side to FIG. 4.

As shown in FIGS. 4 and 5, the first duct 612 is fixed to the inner surface of the side case 23 and the upper surface 613A of the base duct 613 to be described below by means of screws so as to cover the opening 232. The first duct 612 has a box-shaped member having a U-shape in a longitudinal sectional view in which a horizontal opening is formed, and connects the opening 232 to the upper surface 613A of the base duct 613. Inside the first duct 612, although not shown in detail, a air-guiding board is provided which guides air circulating from the left side to the right side of the opening 232 in FIG. 4 to an opening 6136 (see FIG. 6) formed in the base duct 613 and guides air circulating from the right side to the left side of the opening 232 in FIG. 4 to an opening 6137 (see FIG. 6) formed in the base duct 613.

As shown in FIG. 5, between the first duct 612 and the base duct 613, a second cushion 72 is interposed to cover the lower surface of the first duct 612 and to fill the gap between the first duct 612 and the base duct 613. Similarly to the first cushion 71, the second cushion 72 is formed of synthetic resin having elasticity. Therefore, the air circulating in the first duct 612 is sucked by the cooling fans 614 and 615 (to be described below) through the base duct 613 without leakage.

Figure 6:
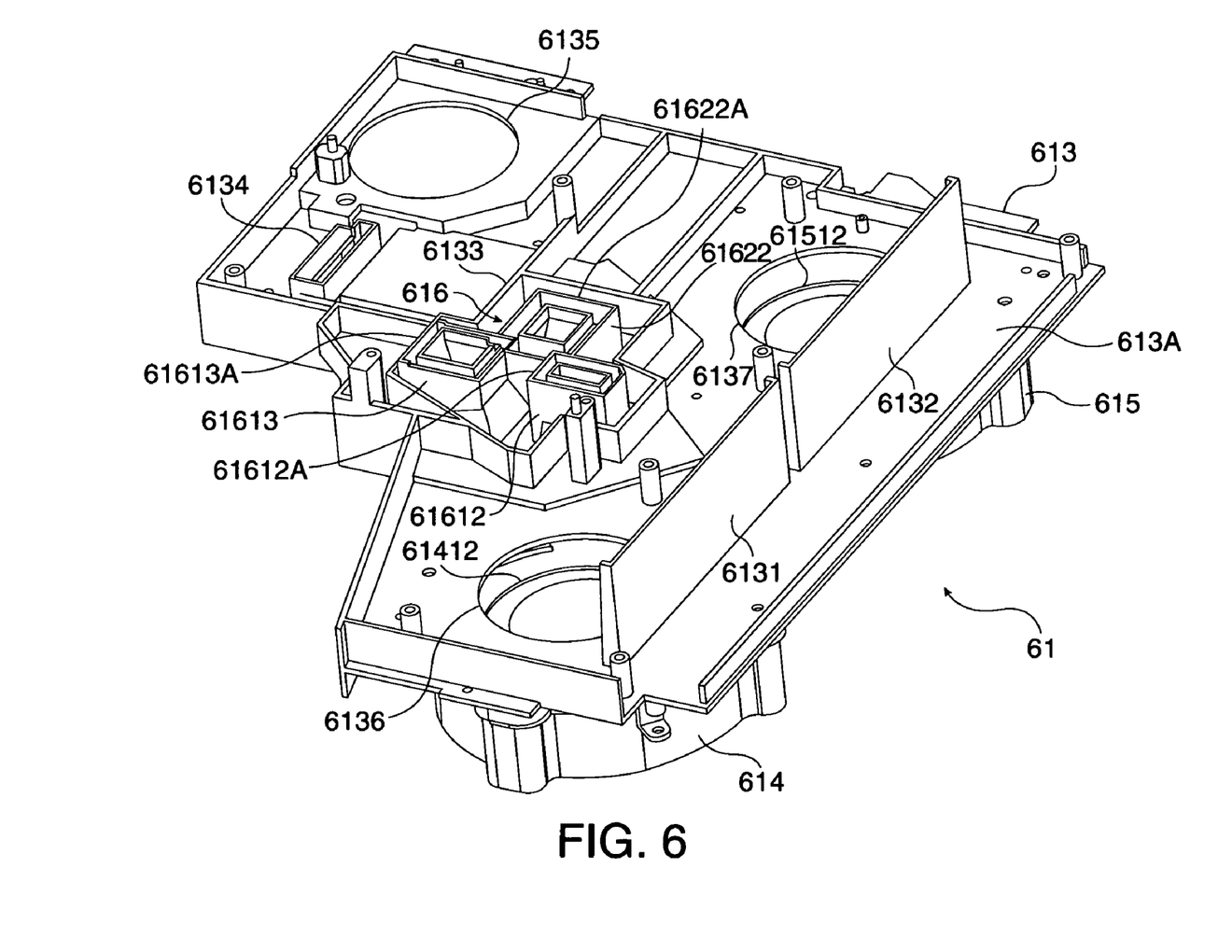
FIG. 6 is a perspective view illustrating a state in which cooling fans and a second duct are assembled to a base duct according to the embodiment of this invention as viewed from the upside.

FIG. 6 is a perspective view illustrating a state in which the cooling fans 614 and 615 and the second duct 616 are assembled to the base duct 613 as viewed from the upside. FIG. 7 is a perspective view illustrating the state shown in FIG. 6 as viewed from the downside.

The base duct 613 guides the air having circulated in the first duct 612 to the suction surfaces of the cooling fans 614 and 615 and is mounted on the inner side of the bottom surface of the lower case 22 (see FIGS. 1 and 2) to support the filter 611, the first duct 612, the cooling fans 614 and 615, and the second duct 616.

More specifically, the filter 611 and the first duct 612 are mounted on the upper surface 613A of the base duct 613, and the cooling fans 614 and 615 and the second duct 616 are mounted on the lower surface 613B as shown in FIG. 7.

As shown in FIG. 6, the base duct 613 is formed into a substantial L shape in plan view. In the base duct 613, rectifying portions 6131 and 6132 each having a plate shape standing on the upper surface 613A, an opening 6133 formed in the approximate center of the base duct, a rectangular opening 6134, and three openings 6135, 6136, and 6137 each having a substantially circular shape are formed.

The rectifying portions 6131 and 6132 is provided to be substantially perpendicular to the circulating direction of the air in the first duct 612 whose end surfaces (plate surfaces) each are mounted on the base duct 613, and rectifies the flow of the air.

The second duct 616 to be described below is exposed through the opening 6133 formed in the approximate center of the base duct 613. The opening 6133 is formed at a position corresponding to the electro-optical device main body 440 (see FIG. 8) constituting the optical unit 4. The air, which has been sucked from the outside of the projector 1 by the cooling fans 614 and 615 mounted on the lower surface 613B through the first duct 612 mounted on the upper surface 613A of the base duct 613, is sent to the electro-optical device main body 440 through the second duct 616.

In the base duct 613, the cooling air is sent from the cooling fan 615 through the second duct 616 to the substantially rectangular opening 6134 formed at a position separated from the rectifying portions 6131 and 6132, more specifically, a position spaced apart from the side case 23. The forming position of the opening 6134 corresponds to the polarization converting element 414 constituting the optical unit 4. The cooling air having introduced from the outside of the projector is sent from the cooling fan 615 to the polarization converting element 414 through the second duct 616 and the opening 6134.

At a position corresponding to the opening 6135 formed at a position separated from the rectifying portions 6131 and 6132 among the three openings 6135, 6136, and 6137 formed into a substantially circular shape in the base duct 613, on the lower surface 613B, the Sirocco fan 631 constituting the third cooling system 63 is mounted. Therefore, the air, which has been introduced into the exterior housing 2 by the first cooling system 61 and cooled the electro-optical device 44, is sucked to the Sirocco fan 631 through the opening 6135 and then is sent to the light source device 411.

The openings 6136 and 6137 are formed at positions capable of being covered inside the first duct 612 when the first duct 612 is mounted on the base duct 613. On the lower surface 613B corresponding to the openings 6136 and 6137, the cooling fans 614 and 615 are mounted. More specifically, at a position corresponding to the opening 6136, the cooling fan 614 is mounted to the opening 6136 to face an air inlet 61412, and at a position corresponding to the opening 6137, the cooling fan 615 is mounted to face an air inlet 61512. Therefore, the cooling air, which has been introduced from the outside of the exterior housing 2 through the first duct 612, is sucked to the cooling fans 614 and 615 through the openings 6136 and 6137.

Figure 8:
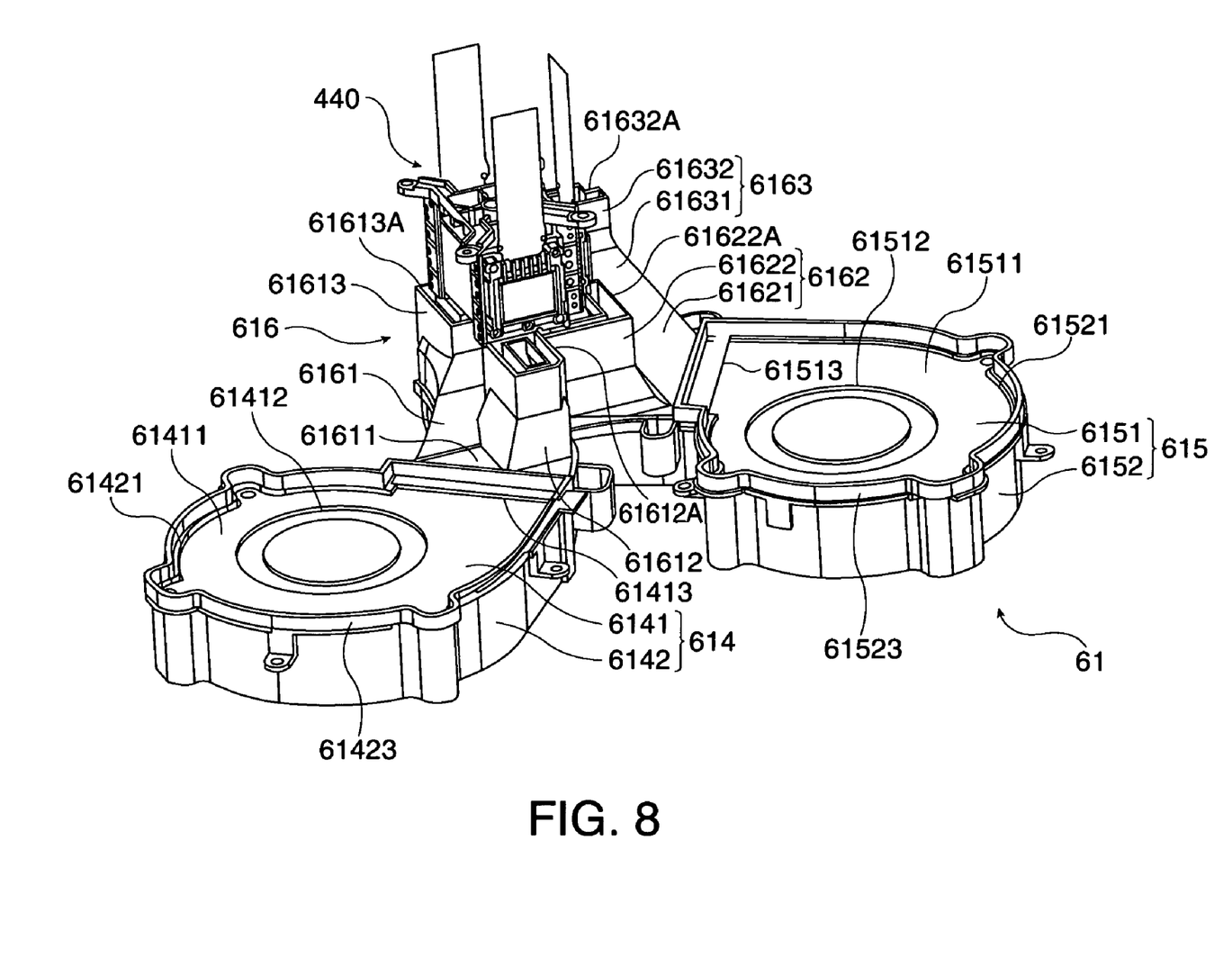
FIG. 8 is a perspective view illustrating the cooling fans, the second duct, and an electro-optical device main body according to the embodiment of this invention.

FIG. 8 is a perspective view illustrating the cooling fans 614 and 615, the second duct 616, and the electro-optical device main body 440. In FIG. 8, the component containing member 452 positioned on the lower side of the electro-optical device main body 440 is not shown.

As described above, the cooling fans 614 and 615 sucks the air introduced from the opening 232 formed in the side case 23 and sends the sucked air to the liquid crystal panels 441 and so on constituting the electro-optical device main body 440. The cooling fans 614 and 615 are mounted at the positions corresponding to the openings 6136 and 6137 on the lower surface 613B of the base duct 613.

As shown in FIG. 8, the cooling fan 614 includes a fan main body 6141 and a fan cover 6142, and the cooling fan 615 includes a fan main body 6151 and a fan cover 6152.

Even though not shown in detail, the fan main body 6141 has a motor (not shown) serving as a rotary drive source having a plurality of blade members provided on the rotating shaft thereof, and a housing 61411 containing the motor inside. The fan main body 6151 has a motor (not shown) serving as a rotary drive source having a plurality of blade members provided on the rotating shaft thereof, and a housing 61511 containing the motor inside. Each of the fan main bodies 6141 and 6151 can be formed of a Sirocco fan.

In the housing 61411, an air inlet 61412 is formed in a surface substantially perpendicular to the rotating shaft of the motor and an air outlet 61413 is formed in a surface along the rotating shaft of the motor to discharge the air sucked from the air inlet 61412 by rotation of the motor. In the housing 61511, an air inlet 61512 is formed in a surface substantially perpendicular to the rotating shaft of the motor and an air outlet 61513 is formed in a surface along the rotating shaft of the motor to discharge the air sucked from the air inlet 61512 by rotation of the motor.

The fan covers 6142 and 6152 are formed to have the same apparent shapes as the fan main bodies 6141 and 6151, respectively. The fan covers 6142 and 6152 are formed of box-shaped members having openings 61421 and 61521 on the upper side, respectively. The fan main body 6141 is contained in the fan cover 6142 through the opening 61421 and the fan main body 6151 is contained in the fan cover 6152 through the opening 61521.

In the fan cover 6142, an opening 61422 (see FIG. 7) is formed at a position corresponding to the air outlet 61413 of the fan main body 6141. In the fan cover 6152, an opening 61522 (see FIG. 7) is formed at a position corresponding to the air outlet 61513 of the fan main body 6151. The second duct 616 is connected to the openings 61422 and 61522. The cooling air sucked by the fan main bodies 6141 and 6151 is sent to the second duct 616 through the openings 61422 and 61522.

That is, the fan covers 6142 and 6152 substantially wholly cover the fan main bodies 6141 and 6151 except for the surfaces where the air inlets 61412 and 61512 are formed and the air outlets 61413 and 61513. In this state, the cooling fans 614 and 615 are fixed to the lower surface 613B of the base duct 613 by means of screws.

In the fan cover 6142, a rib 61423 is formed on the top surface of the side wall where the opening 61421 is formed, that is, on the surface facing the lower surface 613B of the base duct 613 to stand outward the corresponding surface. In the fan cover 6152, a rib 61523 is formed on the top surface of the side wall where the opening 61521 is formed, that is, on the surface facing the lower surface 613B of the base duct 613 to stand outward the corresponding surface.

The rib 61423 is formed to surround the opening 61421 through which the fan main body 6141 is put in the fan cover 6142, and the rib 61523 is formed to surround the opening 61521 through which the fan main body 6151 is put in the fan cover 6152. Further, the rib 61423 presses a third cushion 73 interposed between the fan cover 6142 and the lower surface 613B of the base duct 613, and the rib 61523 presses a fourth cushion 74 interposed between the fan cover 6152 and the lower surface 613B of the base duct 613.

The third cushion 73 and the fourth cushion 74 each corresponds to a first sealing member according to an embodiment of the invention. The third cushion 73 is formed of synthetic resin having elasticity to fill the gap formed between the fan cover 6142 and the lower surface 613B of the base duct 613, and the fourth cushion 74 is formed of synthetic resin having elasticity to fill the gap formed between the fan cover 6152 and the lower surface 613B of the base duct 613. That is, the third and fourth cushions 73 and 74 fill up in the gap between the base duct 613 and the fan cover 6142 and the gap between the base duct 613 and the fan cover 6152 so as to prevent the air in the exterior housing 2 from flowing to the air inlets 61412 and 61512 of the cooling fans 614 and 615. Therefore, when the fan main bodies 6141 and 6151 of the cooling fans 614 and 615 are driven in the state in which the cooling fans 614 and 615 are mounted on the base duct 613, only the air having circulating in the first duct 612 flows to the air inlets 61412 and 61512 of the fan main bodies 6141 and 6151 through the openings 6136 and 6137 formed in the base duct 613.

The second duct 616 guides the cooling air discharged from the cooling fans 614 and 615 to the liquid crystal panels 441 and the polarization converting element 414. The second duct 616 is an integrally-molded synthetic resin product and is fixed to the lower surface 613B of the base duct 613 by means of screws. A portion of the second duct 616 is exposed to the side of the upper surface 613A through the opening 6133 formed in the base duct 613. In the second duct 616, a first air-guiding section 6161, a second air-guiding section 6162, and a third air-guiding section 6163 are formed as shown in FIGS. 7 and 8.

The first air-guiding section 6161 guides the cooling air discharged from the cooling fan 614 to the liquid crystal panels 441R and 441B. In the first air-guiding section 6161, a circulation portion 61611 and two extending portions 61612 and 61613 are formed. The circulation portion 61611 is connected to the opening 61422 of the cooling fan 614. The air discharged from the cooling fan 614 circulates in the circulation portion 61611. The extending portion 61612 branches from the circulation portion 61611, and extends toward the liquid crystal panel 441R of the electro-optical device 44. Similarly, the extending portion 61613 branches from the circulation portion 61611, and extends toward the liquid crystal panel 441B. In the extending portions 61612 and 61613, openings 61612A and 61613A (see FIGS. 6 and 8) are formed at positions corresponding to the liquid crystal panels 441R and 441B, respectively. The cooling air having circulated in the circulation portion 61611 is distributed to the extending portions 61612 and 61613.

That is, the air discharged from the cooling fan 614 circulates in the circulation portion 61611 of the first air-guiding section 6161 and is distributed to the extending portions 61612 and 61613.

The cooling air distributed to the extending portion 61612 is discharged from the opening 61612A formed in the extending portion 61612 and cools the liquid crystal panel 441R and the incident side polarizing plate 442, the viewing angle compensating film 443, and the outgoing side polarizing plate 444 disposed on the incident and outgoing sides of the liquid crystal panel 441R.

Meanwhile, the cooling air distributed to the extending portion 61613 is discharged from the opening 61613A formed in the extending portion 61613 and cools the liquid crystal panel 441B and the incident side polarizing plate 442, the viewing angle compensating film 443, and the outgoing side polarizing plate 444 disposed on the incident and outgoing sides of the liquid crystal panel 441B.

The second air-guiding section 6162 guides the air discharged from the cooling fan 615 to the liquid crystal panel 441G. In the second air-guiding section 6162, a circulation portion 61621 and an extending portion 61622 are formed. The circulation portion 61621 is connected to the opening 61522 of the cooling fan 615. The air discharged from the cooling fan 615 circulates in the circulation portion 61621. The extending portion 61622 branches from the circulation portion 61621, and extends toward the liquid crystal panel 441G. In the extending portion 61622, an opening 61622A is formed at a position corresponding to the liquid crystal panel 441G.

The third air-guiding section 6163 guides a portion of the cooling air discharged from the cooling fan 615 to the polarization converting element 414. In the third air-guiding section 6163, a circulation portion 61631 and an extending portion 61632 are formed. The circulation portion 61631 is connected to the circulation portion 61621 of the second air-guiding section 6162. The air branching from the circulation portion 61621 circulates in the circulation portion 61631. The extending portion 61632 extending from the circulation portion 61631 toward the polarization converting element 414. In the extending portion 61632, an opening 61632A is formed at a position corresponding to the polarization converting element 414.

That is, the air discharged from the cooling fan 615 first flows into the circulation portion 61621 of the second air-guiding section 6162 and then is distributed to the extending portion 61622 and the circulation portion 61631 of the third air-guiding section 6163.

The air circulating in the extending portion 61622 is discharged from the opening 61622A and cools the liquid crystal panel 441G and the incident side polarizing plate 442, the viewing angle compensating film 443, and the outgoing side polarizing plate 444 disposed on the incident and outgoing sides of the liquid crystal panel 441G.

The air circulating in the circulation portion 61631 of the third air-guiding section 6163 circulates in the extending portion 61632 connected to the circulation portion 61631, is discharged through the opening 61632A, and then cools the polarization converting element 414.

The cooling air having cooled the liquid crystal panels 441R, 441G, and 441B and the polarization converting element 414 circulates in the exterior housing 2 and then is sucked by the axial flow fan 621 constituting the second cooling system 62 and the Sirocco fan 631 constituting the third cooling system 63 to cool the power supply unit 5 and the light source device 411. Then, the air having cooled the light source device 411 and the power supply unit 5 is sucked through the duct 641 constituting the exhausting system 64 by the axial flow fan 642 and is exhausted to the outside of the exterior housing 2 through an air outlet (not shown) formed in the upper case 21.

According to the projector 1 according to this embodiment as described above, it is possible to obtain the following effects.

The third cushion 73 is interposed between the cooling fan 614 and the lower surface 613B of the base duct 613. Therefore, when the cooling fan 614 is mounted on the lower surface 613B of the base duct 613, the third cushion 73 is deformed, thereby capable of preventing a gap from being made between the fan cover 6142 of the cooling fan 614 and the base duct 613. For this reason, when the fan main body 6141 of the cooling fan 614 is being driven, it is possible to prevent air from passing between the cooling fan 614 and the base duct 613 to flow into the air inlet 61412 of the fan main body 6141. Therefore, it is possible to purify the air flowing into the first duct 612 through the opening 232 formed in the side case 23 and the filter 611 such that the pure air flows into the air inlet 61412 of the fan main body 6141, and thus it is possible to send the pure air without dust to the liquid crystal panels 441R and 441B and so on.

The fourth cushion 74 interposed between the cooling fan 615 and the base duct 613 has the same effect as the third cushion 73. Therefore, it is possible to send pure air to the liquid crystal panel 441G and the polarization converting element 414.

In the fan covers 6142 and 6152 constituting the cooling fans 614 and 615, the ribs 61423 and 61523 are formed to press the third cushion 73 and the fourth cushion 74, respectively. Therefore, since the fan main bodies 6141 and 6151 constituting the cooling fans 614 and 615 do not directly press the third cushion 73 and the fourth cushion 74, it is possible to prevent the third and fourth cushions from hindering the motors constituting the fan main bodies 6141 and 6151 in rotating. Therefore, it is possible to stably drive the fan main bodies 6141 and 6151 and to stably cool the objects to be cooled, such as the liquid crystal panels 441 and the polarization converting element 414.

The first cushion 71 is interposed as the second sealing member between the side wall of the side case 23 where the opening 232 is formed and the filter 611 provided at the position corresponding to the opening 232. Therefore, it is possible to prevent the formation of a gap between the side case 23 and the filter 611 such that dust enters through the gap into the exterior housing 2. The air introduced into the projector 1 through the opening 232 surely passes through the filter 611 such that the introduced cooling air is reliably purified. Therefore, it is possible to prevent dust from entering into the projector 1 and to reliably purify the cooling air supplied for cooling the liquid crystal panels 441, the polarization converting element 414, etc.

Furthermore, the first cushion 71 interposed between the side wall of the side case 23 where the opening 232 is formed and the filter 611, the second cushion 72 interposed between the first duct 612 and the base duct 613, the third cushion 73 interposed between the base duct 613 and the cooling fan 614, and the fourth cushion 74 interposed between the base duct 613 and the cooling fan 615 each are formed of synthetic resin having elasticity. Therefore, the first to fourth cushions 71 to 74 can be easily deformed. The deformation of the first to fourth cushions 71 to 74 makes it possible to reliably prevent any gap from being made between the side case 23 and the filter 611, between the first duct 612 and the base duct 613, between the base duct 613 and the cooling fan 614, and between the base duct 613 and the cooling fan 615. Therefore, it is possible to more reliably prevent dust from externally entering into the projector 1.

Therefore, since it is possible to reliably pass the cooling air introduced from the opening 232 formed in the side case 23 through the filter 611 so as to be sent to the objects to be cooled, such as the liquid crystal panels 441 and the polarization converting element 414, by means of the cooling fans 614 and 615, it is possible to purify the cooling air for cooling the liquid crystal panels and so on. Therefore, it is possible to send pure air and to maintain adequate cooling efficiency thereof.

Figure 9:
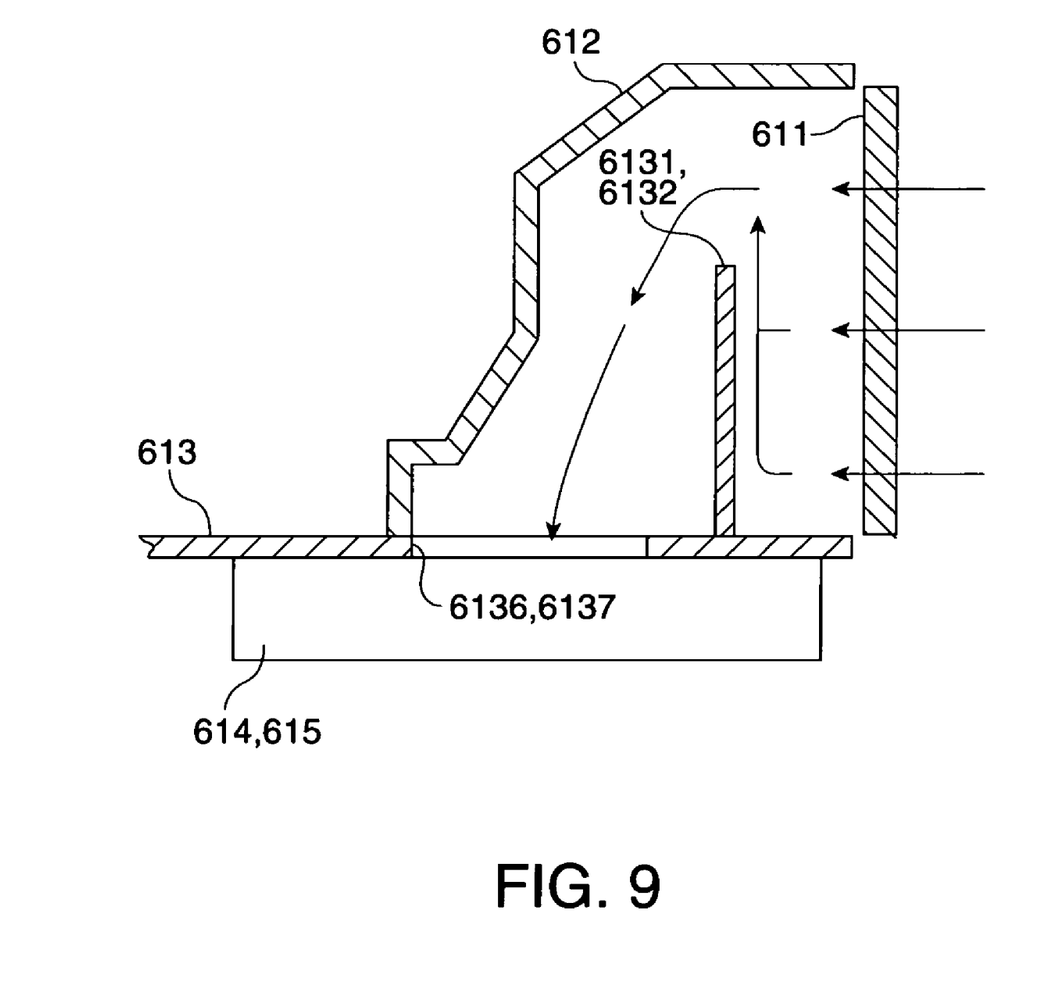
FIG. 9 is a view schematically illustrating the structure in which air is purified by rectifying portions according to the embodiment of this invention.

FIG. 9 is a view schematically illustrating the structure in which the air is purified by the rectifying portions 6131 and 6132.

In this embodiment, as shown in FIG. 9, the rectifying portions 6131 and 6132 are provided to face the filter 611. Therefore, the air introduced into the first duct 612 through the filter 611 once collides with end surfaces of the rectifying portions 6131 and 6132 on the front side of the air flow path and then circulates in the first duct 612. Therefore, it is possible to attach dust, which couldn't have been trapped by the filter 611, to the rectifying portions 6131 and 6132. That is, it is possible to make the rectifying portions 6131 and 6132 function as a second filter to trap minute dust having passed through the filter 611 by means of the rectifying portions 6131 and 6132. Also, even when the filter 611 is partially broken and dust passes through the broken parts of the filter 611, it is possible to trap the dust by means of the rectifying portions 6131 and 6132. Therefore, it is possible to more reliably and purely keep the objects to be cooled, such as the liquid crystal panels 441 and the polarization converting element 414, by providing the rectifying portions 6131 and 6132.

Since the end surfaces of the rectifying portions 6131 and 6132 are formed to be substantially perpendicular to the air circulation direction, it is possible to effectively perform the attachment of dust to the rectifying portions 6131 and 6132.

Modifications

The best structure for embodying the invention has been described above. However, the invention is not limited thereto. That is, since the description limiting the shapes and the materials disclosed above is intended to be illustrative for easier understanding and not to limit the invention, the invention includes the description using a name of each component without a part of or all of the limitation on the shape, the material, etc.

In the above-mentioned embodiment, the duct guiding the air introduced from the opening 232 formed in the side case 23 is composed of the first duct 612, the base duct 613, and the second duct 616. However, the invention is not limited thereto. The duct may be composed of one duct member. In this case, it is possible that one end of the duct member is connected to the opening 232 and the other end of the duct member is connected to an air inlet of a cooling fan such that cooling air sent from the cooling fan is directly sent to the objects to be cooled. Alternatively, it is possible that a cooling fan is provided in a duct and a cushion material is interposed between the cooling fan and the inner surface of the duct.

In the above-mentioned embodiment, the cooling fans 614 and 615 have the fan covers 6142 and 6152, respectively. However, the invention is not limited thereto. The housings 61411 and 61511 constituting the fan main bodies 6141 and 6151 of the cooling fans 614 and 615 may directly press the third cushion 73 and the fourth cushion 74.

Further, in the above-mentioned embodiment, the cooling fans 614 and 615 have the fan main bodies 6141 and 6151 each capable of being composed of a Sirrocco fan. However, the fan main bodies 6141 and 6151 each may be composed of an axial flow fan.

In the above-mentioned embodiment, the first cushion 71 and the second cushion 72, serving as the second sealing members, and the third cushion 73 and the fourth cushion 74, serving as the first sealing members, each are formed of synthetic material having elasticity. However, the invention is not limited thereto. The first to fourth cushions each may be formed of a flexible material, such as rubber.

When the first to fourth cushions 71 to 74 are formed of cushion members, as described above, it is possible to prevent a gap from being made between the members sandwiching any one of the first to fourth cushions 71 to 74 and to form those sealing members at low cost.

In the above-mentioned embodiment, the liquid crystal panels 441, the incident side polarizing plates 442, the viewing angle compensating films 443, the outgoing side polarizing plates 444, and the polarization converting elements 414 are exemplified as the objects to be cooled. However, the invention is not limited thereto. That is, a heat-sensitive component dissipating heat when the projector 1 is driven is required to be cooled. For example, the light source device 411 cooled by the third cooling system 63, the power supply unit 5 cooled by the second cooling system 62, the control unit etc may be the objects to be cooled. The structure of the first cooling system 61 may be applied to the second cooling system 62 and the third cooling system 63.

In the above-mentioned embodiment, the rectifying portions 6131 and 6132 each are formed into a plate shape and is provided to be substantially perpendicular to the air circulation direction in the first duct 612. However, the invention is not limited thereto. When the rectifying portions 6131 and 6132 each extend to cross the air circulation direction in the first duct 612, the shape or arrangement of any of the rectifying portions 6131 and 6132 does not matter. For example, the shape of each rectifying portion is not limited to the plate shape but may be formed of a plate member having a curved surface. Further, each rectifying portion may be provided to be inclined such that the position of the upper end is different from the position of the lower end as viewed from a vertical direction. Furthermore, the number of rectifying portions is not limited to the number of rectifying portions described in the above-mentioned embodiment but may be another number.

In the above-mentioned embodiments, the projector 1 has the three liquid crystal panels 441R, 441G, and 441B. However, the invention is not limited thereto. That is, the invention can be applied to a project in which the number of liquid crystal panels is two or less, or four or more.

Further, in the above-mentioned embodiments, the optical unit 4 has substantially an L shape in plan view. However, the invention is not limited thereto. The optical unit 4 may have substantially a U shape in plan view.

Furthermore, in the above-mentioned embodiment, the transmissive liquid crystal panel 441 having an incident surface and an outgoing surface different from each other is used. However, a reflective liquid crystal panel having the same surface serves an incident surface and an outgoing surface may be used.

In the above-mentioned embodiment, the projector 1 having the liquid crystal panels 441 as light modulating devices are exemplified. A light modulating device having another structure where the flux of incident light is modulated on the basis of image information so as to form an optical image may be used. The invention can be applied to a projector using a light modulating device, such as a device using a micro-mirror other than the liquid crystal panel. In the case of using a device using micro-mirror as a light modulating device, the incident and outgoing side polarizing plates 442 and 444 can be omitted.

In the above-mentioned embodiment, only the projector 1 of a front type in which image projection is performed from a screen viewing direction. However, the invention can be applied to a rear-type projector in which image projection is performed from the opposite side to a screen viewing direction.

The invention can be applied to a projector, in particular, a projector used in an dusty environment.

The entire disclosure of Japanese Patent Application Nos: 2006-047245, filed Feb. 23, 2006 and 2006-047245, filed Apr. 26, 2006 are expressly incorporated by reference herein.

What is claimed is:

1. A projector comprising:
a light source;
a light modulating device that modulates the flux of light emitted from the light source on the basis of image information to form an optical image;
a projection optical system that projects the formed optical image; and
an exterior housing that accommodates the light source, the light modulating device, and the projection optical system, wherein
an opening that introduces air from the outside of the exterior housing into the inside thereof is formed in the exterior housing,
an object to be cooled, a duct connecting the opening to the object to be cooled, and a filter purifying the air introduced from the opening are provided inside the exterior housing,
a cooling fan that sucks the air having been purified through the filter and sends the air to the object to be cooled are provided in the duct,
a first sealing member that fills a gap is interposed between the cooling fan and the duct; and
a second sealing member that fills a gap is interposed between a side wall of the exterior housing where the opening is formed and the filter.

2. The projector according to claim 1, wherein
the cooling fan includes a fan main body which has a blade member supported by a rotating shaft of a rotary drive source and a housing containing the rotary drive source and discharges air, sucked from an air inlet formed in the housing, through an air outlet, and a fan cover which covers the fan main body and has openings formed at positions corresponding to the air inlet and the air outlet, and
a rib that presses the first sealing member is formed on the fan cover.

3. The projector according to claim 1, wherein
the first sealing member is formed of a cushion member.

4. The projector according to claim 1, wherein
a rectifying portion that is provided at the rear side of an air circulation path with respect to the filter and extends so as to cross an air circulation direction in the duct.

* * * * *